United States Patent
Hoshikawa et al.

(10) Patent No.: US 7,141,620 B2
(45) Date of Patent: Nov. 28, 2006

(54) AQUEOUS POLYTETRAFLUOROETHYLENE DISPERSION COMPOSITION AND PROCESS FOR ITS PRODUCTION

(75) Inventors: Jun Hoshikawa, Chiba (JP); Shigeki Kobayashi, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 33 days.

(21) Appl. No.: 10/943,865

(22) Filed: Sep. 20, 2004

(65) Prior Publication Data
US 2005/0038177 A1  Feb. 17, 2005

Related U.S. Application Data

(63) Continuation of application No. PCT/JP03/03422, filed on Mar. 20, 2003.

(30) Foreign Application Priority Data
Mar. 20, 2002  (JP)  .............................. 2002-078785

(51) Int. Cl.
  *C08L 5/06*  (2006.01)
(52) U.S. Cl. ..................... 524/378; 524/198; 524/369; 524/385; 524/389; 524/538; 524/546; 525/539
(58) Field of Classification Search ................ 524/378, 524/546, 369, 385, 389, 538, 198; 525/539
See application file for complete search history.

(56) References Cited

U.S. PATENT DOCUMENTS 3,855,191 A * 12/1974 Doughty et al. ............ 526/214
5,296,165 A * 3/1994 Shimizu et al. ............... 516/77
6,498,207 B1 * 12/2002 Hoshikawa et al. ......... 524/378
6,833,403 B1 * 12/2004 Bladel et al. ................ 524/458
6,861,466 B1 * 3/2005 Dadalas et al. ............. 524/544
2005/0038177 A1 * 2/2005 Hoshikawa et al.

FOREIGN PATENT DOCUMENTS

| CN | 1180364 A | 4/1998 |
|---|---|---|
| JP | 2002-308913 A | 10/2002 |
| JP | 2002-308914 A | 10/2002 |

OTHER PUBLICATIONS

U.S. Appl. No. 11/414,400, filed May 1, 2006, Hoshikawa et al.*

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

To an aqueous PTFE polymer emulsion having a PTFE content of from 10 to 50 mass % obtained by emulsion polymerization of tetrafluoroethylene in the presence of an anionic perfluorocarboxylate surfactant (APFC), from 2 to 20 mass %, based on the mass of PTFE, of a nonionic surfactant having an average molecular weight of from 450 to 800 and an inorganic/organic property ratio of from 1.07 to 1.50 and from 10 to 800 mass %, based on the mass of PTFE, of water are added to obtain an aqueous PTFE dispersion having a PTFE content of from 1 to 40 mass % of PTFE, and then PTFE is concentrated by sedimenting the PTFE and separating a PTFE-rich aqueous dispersion composition from the supernatant. According to the present invention, a PTFE-rich aqueous dispersion composition having a low APFC concentration can be obtained.

10 Claims, No Drawings

AQUEOUS POLYTETRAFLUOROETHYLENE DISPERSION COMPOSITION AND PROCESS FOR ITS PRODUCTION

TECHNICAL FIELD

The present invention relates to a process for producing an aqueous polytetrafluoroethylene (hereinafter referred to as PTFE) dispersion composition and an aqueous PTFE dispersion composition obtained by the process for its production.

BACKGROUND ART

An emulsion polymerized PTFE is obtained by polymerizing the tetrafluoroethylene (hereinafter referred to as TFE) monomer, in the presence of water, a polymerization initiator, an anionic perfluorocarboxylate surfactant (hereinafter referred to as APFC) and a paraffin wax stabilizer, and it is obtained as an aqueous PTFE polymer emulsion containing PTFE particles.

The aqueous PTFE polymer emulsion after the polymerization is used directly, after concentration, or as an aqueous PTFE dispersion composition after blended with a surfactant, a filler or other known components as the case requires. However, it has not been industrially common to specially remove APFC from an aqueous PTFE dispersion composition.

After used in polymerization of PTFE, expensive APFC is preferably recovered as much as possible for reuse.

In order to remove APFC from the aqueous PTFE dispersion composition, WO 00/35971 proposes adsorption of APFC by passing an aqueous PTFE dispersion composition through an ion exchange resin. However, there is a problem that adsorption performance deteriorates since PTFE particles occlude the ion exchange resin.

In order to remove APFC from the aqueous PTFE dispersion composition, WO00/35971 proposes adsorption of APFC by passing an aqueous PTFE dispersion composition through an ion exchange resin. However, there is a problem that adsorption performance deteriorates since PTFE particles occlude the ion exchange resin.

Further, WO 01/79332 has proposed volatilization of APFC by boiling an aqueous PTFE dispersion composition. However, there is a problem that agglomeration during the treatment tends to lower the yield.

It is an object of the present invention to provide a method for lowering the APFC concentration in the aqueous PTFE dispersion composition efficiently and an aqueous PTFE dispersion composition obtained by the method.

The present inventors have conducted extensive studies to overcome the above problems and as a result, have discovered that APFC adsorbed on the surface of the PTFE particles efficiently transfers to the aqueous phase upon addition of a specific amount of a specific nonionic surfactant and water to the aqueous PTFE polymer emulsion, and have found that the APFC concentration in the aqueous PTFE dispersion composition can be decreased drastically by removing the aqueous phase in a concentration step which comprises sedimenting PTFE and separating a PTFE-rich aqueous dispersion composition from the supernatant. The present invention has been accomplished on the basis of these discoveries. It is possible to recover a large amount of APFC from the aqueous phase.

DISCLOSURE OF THE INVENTION

Namely, the present invention provides a process for producing an aqueous PTFE dispersion composition, characterized in that the process comprises adding from 2 to 20 mass %, based on the mass of PTFE, of a nonionic surfactant having an average molecular weight of from 450 to 800 and an inorganic/organic property ratio of from 1.07 to 1.50 and from 10 to 800 mass %, based on the mass of PTFE, of water to an aqueous PTFE polymer emulsion having a PTFE content of from 10 to 50 mass % obtained by emulsion polymerization of TFE in the presence of an anionic APFC surfactant to obtain an aqueous PTFE dispersion having a PTFE content of from 1 to 40 mass %; and concentrating the PTFE by sedimenting PTFE and separating a PTFE-rich aqueous dispersion composition from the supernatant.

Further, the present invention provides the above process for producing an aqueous PTFE dispersion composition, wherein the nonionic surfactant is added in an amount of from 2.5 to 12 mass %, based on the mass of PTFE, and water is added in an amount of from 20 to 500 mass %, based on the mass of PTFE.

Further, the present invention provides a process for producing an aqueous PTFE dispersion composition, characterized in that the process comprises further adding from 0 to 20 mass %, based on the mass of PTFE, of a nonionic surfactant and from 20 to 500 mass %, based on the mass of PTFE, of water to the PTFE-rich aqueous dispersion composition obtained by the above-mentioned process for producing an aqueous PTFE dispersion composition, and concentrating PTFE by sedimenting the PTFE and separating a PTFE-rich aqueous dispersion composition from the supernatant.

Further, the present invention provides an aqueous PTFE dispersion composition obtained by the process for producing an aqueous PTFE dispersion composition, characterized in that the content of the anionic APFC surfactant is less than 500 ppm based on the mass of PTFE.

Further, the present invention provides an aqueous PTFE dispersion composition produced by the process for producing an aqueous PTFE dispersion composition, characterized in that the content of the anionic APFC surfactant is less than 300 ppm based on the mass of PTFE.

BEST MODE FOR CARRYING OUT THE INVENTION

The aqueous PTFE polymer emulsion to be used as a starting material in the present invention is obtainable by emulsion polymerization of TFE in the presence of an anionic APFC surfactant and has a PTFE content of from 10 to 50 mass %.

Here, PTFE includes a homopolymer of TFE or a so-called modified PTFE which contains polymerized units derived from a comonomer component copolymerizable with TFE, for example, a halogenated ethylene such as chlorotrifluoroethylene, a halogenated propylene such as hexafluoropropylene or a fluorovinyl ether such as a perfluoroalkyl vinyl ether, in such a small amount that melt-processing is substantially impossible. The average molecular weight of PTFE is preferably within a range of from 100,000 to 100,000,000.

The aqueous PTFE polymer emulsion is preferably obtained by polymerizing the TFE monomer injected under a pressure of from 2 to 50 atm, in the presence of pure water, a peroxide type polymerization initiator, an anionic APFC surfactant, a paraffin wax stabilizer and the like.

The anionic APFC surfactant is preferably represented by the formula (1):

$$X\text{—}COOY \qquad (1)$$

wherein X is a perfluorohydrocarbon group, and Y is a basic group.

The perfluorohydrocarbon group as X in the formula (1) preferably has a carbon number of from 3 to 12, more preferably from 4 to 10. X is particularly preferably $C_7F_{15}$. The basic group as Y is $NH_4$, an amino group, an alkali metal, an alkaline earth metal or the like, and preferably $NH_4$.

The average particle diameter of PTFE in the aqueous PTFE polymer emulsion is preferably from 0.15 to 0.50 μm, more preferably from 0.18 to 0.45 μm, particularly preferably from 0.2 to 0.35 μm. It is undesirable that the particle diameter is too small because PTFE hardly sediments in the concentration step, and it is also undesirable that the particle diameter is too large because the storage stability of the product deteriorates.

The PTFE particles in the aqueous PTFE polymer emulsion preferably have spherical shapes or a spindle shapes having an average aspect ratio of from 1 to 3, wherein the aspect ratio is obtained by dividing the major axis by the minor axis. So-called needlelike particles having extremely large aspect ratios are undesirable, because, PTFE hardly sediments in the concentration step, and APFC tends to stay on the surfaces of such PTFE particles having large surface areas.

The PTFE concentration in the aqueous PTFE polymer emulsion is preferably from 10 to 50 mass %, more preferably from 15 to 40 mass %, particularly preferably from 20 to 35 mass %. It is not preferred to complete the polymerization step while the PTFE concentration is low because the PTFE particles tend to have too small particle diameters or contain needlelike particles.

The nonionic surfactant to be used in the present invention preferably has an average molecular weight of from 450 to 800, more preferably from 500 to 750, particularly preferably from 550 to 700. If the average molecular weight is out of the range, the effect of detaching APFC from PTFE will unfavorably decrease. Further, it is undesirable that the average molecular weight is larger than the range because it has a high pour point and is difficult to handle. On the other hand, it is also undesirable that the average molecular weight is smaller than the range, because it gives an aqueous PTFE dispersion composition having a high liquid surface tension unsuitable for coating use.

Further, the nonionic surfactant preferably has an inorganic/organic property ratio from 1.07 to 1.50, particularly preferably from 1.10 to 1.40. If the inorganic/organic property ratio is within the range, transfer of APFC, adsorbed on the surfaces of the PTFE particles to the aqueous phase is specifically expedited. If the inorganic/organic property ratio is smaller or larger than the range, this effect will decrease.

The inorganic/organic property ratio is a ratio of parameters based on the organic conceptual diagram proposed by Atsushi Fujita and is obtained by calculating an inorganic value and an organic value from the molecular structures of a surfactant, by using e.g. the table on p.198 in Shin•Kaimen Kasseizai Nyumon written by Takehiko Fujimoto (1981, issued by Sanyo Chemical Industries, Ltd.), and then by dividing the inorganic value by the organic value. The inorganic/organic property ratio of a commercially available nonionic surfactant in the form of a mixture having a molecular weight distribution can be calculated from the average molecular formula identifying the surfactant.

The nonionic surfactant is suitably a polyoxyalkylene alkyl ether type nonionic surfactant represented by the formula (2) or a polyoxyethylene alkylphenyl ether type nonionic surfactant represented by the formula (3).

$$R\text{—}O\text{-}A\text{-}H \qquad (2)$$

wherein R is a primary or secondary, straight or branched chain alkyl group represented by $C_xH_{2x+1}$, where x is from 8 to 18, and A is a polyoxyalkylene chain constituted solely by oxyethylene or by a copolymer of oxyethylene and oxypropylene.

In the formula (2), the alkyl group preferably has a carbon number of from 11 to 18, particularly preferably from 12 to 16.

$$R'\text{—}C_6H_4\text{—}O\text{-}A'\text{—}H \qquad (3)$$

wherein R' is a straight or branched chain alkyl group represented by $C_{x'}H_{2x'+1}$ where x' is from 4 to 12, and A' is a polyoxyethylene chain.

As suitable specific examples, nonionic surfactants having such average molecular formulae as $C_{13}H_{27}$—$(OC_2H_4)_{10}$—OH (molecular weight=641, inorganic/organic property ratio=1.29), $C_{12}H_{25}$—$(OC_2H_4)_{10}$—OH (molecular weight=627, inorganic/organic property ratio=1.33), $C_{10}H_{21}CH(CH_3)CH_2$—$(OC_2H_4)_9$—OH (molecular weight=597, inorganic/organic property ratio=1.29), $C_{13}H_{27}$—$(OC_2H_4)_9$—$OCH(CH_3)CH_2$—OH (molecular weight=655, inorganic/organic property ratio=1.19), $C_{16}H_{33}$—$(OC_2H_4)_{10}$—OH (molecular weight=683, inorganic/organic property ratio=1.18), $HC(C_5H_{11})(C_7H_{15})$—$(OC_2H_4)_9$—OH (molecular weight=597, inorganic organic property ratio=1.29) and $C(CH_3)_3CH_2C(CH_3)_2C_6H_4$—$(OC_2H_4)_{10}$—OH (molecular weight=647, inorganic/organic property ratio=1.35) may be used.

In the present invention, the nonionic surfactant is preferably added to the aqueous PTFE polymer emulsion in an amount of from 2 to 20 mass %, more preferably from 2.5 to 12 mass %, based on the mass of PTFE. It is undesirable that the amount is small because APFC hardly separates from PTFE particles. It is also undesirable that the amount is too large because not only it is uneconomical, but also the nonionic surfactant concentration in the resulting PTFE-rich aqueous dispersion composition will be too high.

In the present invention, as the water to be added to the aqueous PTFE polymer emulsion, distilled water or deionized water is preferred for stable viscosity. Preliminary dilution of the nonionic surfactant with all or part of the water is preferred because a nonionic surfactant having a particularly high molecular weight, if used, will readily mix with the aqueous PTFE polymer emulsion.

The amount of water added is preferably large because more APFC transfers to the aqueous phase. However, if it is too large, the sedimentation and concentration of the PTFE particles will take long time, and the productivity will decrease. Therefore, it is preferably from 10 to 800 mass %, more preferably from 20 to 600 mass %, further preferably from 30 to 500 mass %, based on the mass of PTFE.

The PTFE concentration of the aqueous PTFE dispersion after addition of water and the nonionic surfactant is preferably from 1 to 40 mass %, more preferably from 3 to 30 mass %, further preferably from 4 to 24 mass %, particularly preferably from 5 to 19 mass %.

Further, along with water and the nonionic surfactant, it is possible to add a small amount of anionic surfactants other than APFC, an organic acid such as succinic acid or citric acid, an organic acid salt, an inorganic acid, an inorganic base such as ammonia, an inorganic acid salt and the like to the aqueous PTFE dispersion composition, for the purpose of improving the concentration rate, and in some cases, expediting transfer of APFC to the aqueous phase.

In the present invention, the PTFE particles may be concentrated by various methods such as the ED method (Electro-decantation method) based on the fact that PTFE has a larger absolute specific gravity at a level of approximately 2.2 than water, as disclosed in Shikizai (48 (1975) p510, Takaomi Satokawa) and a phase separation method (thermal concentration method).

After the addition of the nonionic surfactant and water, the aqueous PTFE dispersion is allowed to sediment the PTFE particles and form a supernatant containing a large amount of APFC on the top. Removal of the supernatant gives a PTFE-rich aqueous dispersion composition containing a small amount of APFC.

Further, in the step of concentrating the PTFE particles, the aqueous PTFE dispersion can be continuously or periodically supplied from half the depth of a condensation apparatus, and the supernatant produced on the top is separated off by letting the supernatant overflow, while the PTFE-rich aqueous dispersion composition produced at the bottom can be continuously collected and separated.

The resulting PTFE-rich aqueous dispersion composition preferably has a PTFE concentration of from 30 to 70 mass %, more preferably from 50 to 70 mass %, and particularly preferably from 60 to 70 mass %. The higher the concentration is, the less APFC the PTFE-rich aqueous dispersion composition contains. However, an extremely high PTFE concentration is undesired because the PTFE particles tend to agglomerate in the step.

Further, in the present invention, it is possible to further add from 0 to 20 mass %, based on the mass of PTFE, of a nonionic surfactant and from 20 to 500 mass %, based on the mass of PTFE, of water to the PTFE-rich aqueous dispersion composition obtained as described above, and then repeat the concentration step, for the purpose of further decreasing the APFC concentration in the resulting PTFE-rich aqueous dispersion composition. Further, the concentration step may be repeated two or more times.

The resulting PTFE-rich aqueous dispersion composition has a low APFC concentration based on the mass of PTFE.

Further, the PTFE-rich aqueous dispersion composition with a low APFC concentration prepared according to the present invention can be used directly or after dilution with water, or a nonionic surfactant may be added subsequently thereto for the improvement of stability, viscosity or wettability. Further, for prevention of degradation or the stabilization of the viscosity, the composition may be adjusted with ammonia and the like to pH 8–11, preferably 9–10. Further, it is also possible to add anionic surfactants, polyethylene oxide type or polyurethane type viscosity regulators, various leveling agents, antiseptic agents, coloring agents, fillers, organic solvents and other known components, as the case requires, to make the aqueous PTFE dispersion composition suitable for practical use. Further, in the present invention, the meaning of the aqueous PTFE dispersion composition includes the PTFE-rich aqueous dispersion composition.

The PTFE concentration in the aqueous PTFE dispersion composition is preferably from 30 to 70 mass %, more preferably from 50 to 70 mass %, particularly preferably from 60 to 70 mass %.

Further, the concentration of the nonionic surfactant in the aqueous PTFE dispersion composition is preferably from 2 to 20 mass %, more preferably from 2.5 to 12 mass % based on the mass of PTFE, though it is varied according to the purpose of use.

The APFC concentration in the aqueous PTFE dispersion composition is preferably less than 500 ppm, particularly preferably less than 300 ppm based on the mass of PTFE.

The APFC contained in a large amount in the supernatant separated in the present invention, can be recovered by a known process such as ion exchange recovery, solvent extraction, evaporation to dryness or distillation. The supernatant containing few PTFE particles rarely causes occlusion of the ion exchange resin or clogging of the pretreatment filter, and therefore, an industrially stable recovery process is readily achieved.

Now, the present invention will be described in further detail with reference to Examples and Comparative Examples, but these will by no means restrict the present invention.

Here, working Examples are Examples 1 to 5, 11 and 12, and Comparative Examples are Examples 6 to 10.

An evaluation method for each item will be shown below.

(A) PTFE average molecular weight: In accordance with the method by Suwa et al.(described in J. Appl. Polym. Sci, 17, 3253 (1973)), it is obtained from a latent heat measured by differential calorimetry.

(B) PTFE average particle diameter: After drying, an aqueous PTFE dispersion was photographed at a magnification of 10000 by using a scanning electron microscope, and the average value was obtained.

(C) PTFE concentration and surfactant concentration: Approximately 10 g of a dispersion sample was put in an aluminum plate of a known mass and weighed after dehydration at 120° C. for an hour and after thermal decomposition of the surfactant at 380° C. for 35 minutes, and the PTFE concentration and the surfactant concentration based on the mass of PTFE were calculated. In the present invention, the surfactant concentration was calculated by including APFC.

(D) APFC concentration: In a test tube, 5 mL of a methylene blue solution (obtained by gradually adding 12 g of sulfuric acid to approximately 500 mL of water, cooling it, dissolving 0.03 g of methylene blue and 50 g of anhydrous sodium sulfate therein, and then adding water thereto to prepare 1 L of the solution) and 5 mL of chloroform were put, and 1 g of a 10-fold diluted solution of the sample was added. The tube was shaked intensively and then left standing. The lower chloroform phase was collected and filtrated through a filter having pore diameter of 0.2 μm, and the absorbance at 650 nm was measured with a spectrophotometer. In accordance with the amount of APFC as the anionic surfactant, the chloroform phase changed blue. The absorbance was measured similarly by using 1 g of an aqueous APFC solution having a known concentration, and a calibration curve was prepared. Then, the APFC concentration in the sample was obtained by using the calibration curve. Further, the APFC concentration in the aqueous PTFE dispersion composition was rated as good, if it was less than 500 ppm, and bad if it is at least 500 ppm, based on the PTFE mass.

(E) pH: It was measured by the glass electrode method.

Further, the surfactants (a) to (h) used in the respective examples correspond to the surfactants represented by the codes in Tables 1 and 2. The chemical structures of the surfactants are shown in Table 3.

EXAMPLES 1 TO 5

TFE was polymerized by emulsion polymerization in the presence of ammonium perfluorooctanoate as APFC, preliminarily added in an amount of 3000 ppm based on the mass of PTFE, to obtain an aqueous PTFE polymer emulsion containing spherical PTFE particles having an average particle diameter of 0.25 μm, an average molecular weight of approximately 3,000,000 with a PTFE concentration of 30 mass %.

The resulting aqueous PTFE polymer emulsion was stirred and agglomerated to recover PTFE. The APFC concentration was analyzed and was found to be 2800 ppm based on the mass of PTFE, and most of the APFC was adsorbed on PTFE fine particles.

Each of the nonionic surfactant (a) to (e) was preliminary dissolved in 300 mass % of distilled water in a ratio of 6 mass % based on the mass of PTFE based on the mass of PTFE and then added to the aqueous PTFE polymer emulsion. Concentration was carried out by the ED method to obtain a PTFE-rich aqueous dispersion composition with a TFE concentration of approximately 66 mass %.

The surfactant (a) was added to the PTFE-rich aqueous dispersion compositions, and then water and ammonia were added to obtain aqueous PTFE dispersion compositions shown as composition (1) to (5) in Table 1.

The APFC concentrations in the aqueous PTFE dispersion compositions were from 294 to 425 ppm based on the mass of PTFE and indicated favorable drastical decrease from the amount added before the polymerization.

EXAMPLES 6 TO 8

COMPARATIVE EXAMPLES

The operation in Example 1 was carried out except that (f) to (h) were added as nonionic surfactants to the aqueous PTFE polymer emulsion, and aqueous PTFE dispersion compositions having undesirable APFC concentrations of at least 750 ppm based on the mass of PTFE.

Example 9

Comparative Example

The operation in Example 1 was carried out except that water was not added before the concentration step to obtain an aqueous PTFE dispersion composition having an undesirable APFC concentration of 830 ppm based on the mass of PTFE.

Example 10

Comparative Example

The operation in Example 3 was carried out except that the nonionic surfactant (c) was added in an amount of 1.5 mass % based on the mass of PTFE to obtain a PTFE-rich aqueous dispersion composition having an undesirable APFC concentration of 1320 ppm based on the mass of PTFE.

Example 11

To the aqueous PTFE polymer emulsion obtained in Example 1, 12 mass % of the nonionic surfactant (a) based on the mass of PTFE was added, and then 50 mass % of distilled water and 500 ppm of ammonia based on the mass of PTFE were further added. Then, it was left standing overnight at 90° C., and then a PTFE concentrate having a PTFE concentration of approximately 64 mass % and having a surfactant concentration of 3.5 mass %, based on the mass of PTFE, was obtained by phase separation. The APFC concentration was as low as 220 ppm, based on the mass of PTFE.

Example 12

To the PTFE-rich aqueous dispersion composition prepared in Example 1, 6 mass % of the nonionic surfactant (a) and 300 mass % of water based on the mass of PTFE were further added, and concentration was carried out by the ED method to obtain a PTFE concentrate containing approximately 65 mass % of PTFE. The concentrate gave a good aqueous PTFE dispersion composition having such a low APFC concentration as 130 ppm based on the mass of PTFE.

TABLE 1

|  | Items | Ex. 1 | Ex. 2 | Ex. 3 | Ex. 4 | Ex. 5 |
|---|---|---|---|---|---|---|
| Aqueous PTFE polymer emulsion | PTFE concentration (mass %) | 30 | 30 | 30 | 30 | 30 |
|  | APFC concentration (ppm/PTFE)) | 3000 | 3000 | 3000 | 3000 | 3000 |
| Addition to aqueous PTFE polymer emulsion | Added amount of nonionic surfactant (mass %/PTFE) | (a) 6 | (b) 6 | (c) 3 | (d) 6 | (e) 6 |
|  | Added amount of water (mass %/PTFE) | 300 | 300 | 500 | 300 | 300 |
|  | Concentration step | ED method | ED method | ED method | ED method | ED method |
| PTFE-rich aqueous dispersion composition | PTFE concentration (mass %) | 66.5 | 66.8 | 66.3 | 67.1 | 66.1 |
|  | Surfactant concentration (mass %/PTFE) | 2.4 | 2.3 | 1.8 | 2.5 | 2.5 |

TABLE 1-continued

|  | Items | Ex. 1 | Ex. 2 | Ex. 3 | Ex. 4 | Ex. 5 |
|---|---|---|---|---|---|---|
|  | APFC concentration (ppm/PTFC) | 294 | 362 | 390 | 425 | 324 |
|  | APFC residual ratio (mass %) | 9.8 | 12.0 | 13.0 | 14.2 | 10.8 |
| Addition to PTFE-rich aqueous dispersion composition | Added amount of water (mass %/PTFE) | 12.1 | 12.0 | 176.7 | 18.2 | 14.8 |
|  | Added amount of nonionic surfactant (mass %/PTFE) | (a) 2.6 | (a) 3.2 | (a) 3.4 | (a) 4.1 | (a) 7.0 |
|  | Added amount of 25% ammonium water (mass %/PTFE) | 0.1 | 0.1 | 0.15 | 0.15 | 0.15 |
| Properties of resulting aqueous PTFE dispersion composition | PTFE concentration (mass %) | 60.5 | 60.6 | 30.2 | 55.4 | 55.3 |
|  | Surfactant concentration (mass %/PTFE) | 5.0 | 5.5 | 5.2 | 6.6 | 9.5 |
|  | APFC concentration (ppm/PTFE) | 294 | 362 | 390 | 425 | 324 |
|  | pH | 9.1 | 9.2 | 9.5 | 9.5 | 9.3 |
| Evaluation of APFC concentration |  | Good | Good | Good | Good | Good |

TABLE 2

|  | Items | Ex. 6 | Ex. 7 | Ex. 8 | Ex. 9 | Ex. 10 |
|---|---|---|---|---|---|---|
| Aqueous PTFE polymer emulsion | PTFE concentration (mass %) | 30 | 30 | 30 | 30 | 30 |
|  | APFC concentration (ppm/PTFE)) | 3000 | 3000 | 3000 | 3000 | 3000 |
| Addition to aqueous PTFE polymer emulsion | Added amount of nonionic surfactant (mass %/PTFE) | (f) 6 | (g) 6 | (h) 6 | (a) 6 | (c) 1.5 |
|  | Added amount of water (mass %/PTFE) | 300 | 300 | 300 | 0 | 300 |
|  | Concentration step | ED method | ED method | ED method | ED method | ED method |
| PTFE-rich aqueous dispersion composition | PTFE concentration (mass %) | 63.2 | 64.1 | 63.4 | 67.8 | 66.2 |
|  | Surfactant concentration (mass %/PTFE) | 2.4 | 2.3 | 1.8 | 2.5 | 2.5 |
|  | APFC concentration (ppm/PTFC) | 1130 | 750 | 920 | 830 | 1320 |
|  | APFC residual ratio (mass %) | 37.6 | 25.0 | 30.7 | 27.7 | 44.0 |
| Addition to PTFE-rich aqueous dispersion composition | Added amount of water (mass %/PTFE) | 3.5 | 4.6 | 2.9 | 10.2 | 15.8 |
|  | Added amount of nonionic surfactant (mass %/PTFE) | (a) 2.7 | (a) 3.0 | (a) 3.3 | (a) 2.6 | (a) 6.0 |
|  | Added amount of 25% ammonium water (mass %/PTFE) | 0.15 | 0.15 | 0.15 | 0.15 | 0.15 |
| Properties of resulting aqueous PTFE dispersion composition | PTFE concentration (mass %) | 60.0 | 60.1 | 60.3 | 60.5 | 55.3 |
|  | Surfactant concentration (mass %/PTFE) | 5.1 | 5.3 | 5.1 | 5.1 | 8.5 |
|  | APFC concentration (ppm/PTFE) | 1130 | 750 | 920 | 830 | 1320 |
|  | pH | 9.5 | 9.3 | 9.5 | 9.4 | 9.2 |
| Evaluation of APFC concentration |  | bad | bad | bad | bad | bad |

TABLE 3

| No. | Average molecular formula of surfactant | Average molecular weight | Inorganic value | Organic value | Inorganic/organic property ratio |
|---|---|---|---|---|---|
| (a) | $C_{13}H_{27}$—$(OC_2H_4)_{8.5}$—$OCH(CH_3)CH_2$—$OH$ | 633 | 760 | 758 | 1.17 |
| (b) | $C(CH_3)_3CH_2C(CH_3)_2(C_6H_4)$—$(OC_2H_4)_{11}$—$OH$ | 691 | 940 | 680 | 1.38 |
| (c) | $HC(C_5H_{11})(C_7H_{15})$—$(OC_2H_4)_9$—$OH$ | 597 | 775 | 600 | 1.29 |
| (d) | $C_{18}H_{37}$—$(OC_2H_4)_{10}$—$OH$ | 711 | 850 | 760 | 1.12 |
| (e) | $C_{16}H_{33}$—$(OC_2H_4)_{10}$—$OH$ | 683 | 850 | 720 | 1.18 |
| (f) | $C_{13}H_{27}$—$(OC_2H_4)_5$—$OH$ | 421 | 475 | 460 | 1.03 |
| (g) | $C_{12}H_{25}$—$(OC_2H_4)_{20}$—$OH$ | 1067 | 1600 | 1040 | 1.54 |
| (h) | $C(CH_3)_3CH_2C(CH_3)_2(C_6H_4)$—$(OC_2H_4)_{30}$—$OH$ | 1528 | 2365 | 1440 | 1.64 |

The present invention provides a preferable aqueous PTFE dispersion composition by decreasing the APFC concentration in an aqueous PTFE dispersion composition.

The entire disclosure of Japanese Patent Application No. 2002-078785 filed on Mar. 20, 2002 including specification, claims and summary is incorporated herein by reference in its entirety.

What is claimed is:

1. A process for producing an aqueous polytetrafluoroethylene dispersion composition, comprising:

adding from 2 to 20 wt %, based on the weight of polytetrafluoroethylene, of a nonionic surfactant, having an average molecular weight ranging from 450 to 800 and an inorganic/organic property ratio ranging from 1.07 to 1.50, and from 10 to 800 weight %, based on the weight of polytetrafluoroethylene, of water to an aqueous polytetrafluoroethylene polymer emulsion having a polytetrafluoroethylene content ranging from 10 to 50 wt % that is obtained by emulsion polymerization of tetrafluoroethylene in the presence of an anionic perfluorocarboxylate surfactant, thereby producing an aqueous polytetrafluoroethylene dispersion having a polytetrafluoroethylene content ranging from 1 to 40 wt %;

obtaining a polytetrafluoroethylene-rich dispersion by permitting said aqueous polytetrafluoroethylene dispersion formed in the step above to separate into two aqueous phases, the supernatant phase being an aqueous phase substantially containing said anionic perfluorocarboxylate surfactant and the remaining phase being said polytetrafluoroethylene-rich aqueous dispersion; and separating the polytetrafluoroethylene-rich aqueous dispersion from the aqueous supernatant that contains said anionic perfluorocarboxylate surfactant.

2. The process for producing an aqueous polytetrafluoroethylene dispersion composition according to claim 1, wherein the nonionic surfactant is added in an amount ranging from 2.5 to 12 wt %, based on the weight of polytetrafluoroethylene, and water is added in an amount ranging from 20 to 500 wt %, based on the weight of polytetrafluoroethylene.

3. The process for producing an aqueous polytetrafluoroethylene dispersion composition according to claim 1, wherein the polytetrafluoroethylene-rich aqueous dispersion has a PTFE concentration of 30 to 70 wt %.

4. The process for producing an aqueous polytetrafluoroethylene dispersion composition according to claim 3, wherein the polytetrafluoroethylene-rich aqueous dispersion has a PTFE concentration of 50 to 70 wt %.

5. The process for producing an aqueous polytetrafluoroethylene dispersion composition according to claim 1, wherein the inorganic/organic property ratio ranges from 1.10 to 1.40.

6. The process for producing an aqueous polytetrafluoroethylene dispersion composition according to claim 1, wherein the nonionic surfactant is a polyoxyalkylene alkyl ether of formula (2):

$$R\text{—}O\text{-}A\text{-}H \qquad (2)$$

wherein R is a primary or secondary, straight or branched chain $C_{11-18}$-alkyl group represented by $C_xH_{2x+1}$, where x ranges from 8 to 18, and A is a polyoxyalkylene chain constituted solely by oxyethylene or by a copolymer of oxyethylene and oxypropylene, or is polyoxyalkylene alkyl ether of formula (3):

$$R'\text{—}C_6H_4\text{—}O\text{-}A'\text{-}H \qquad (3)$$

wherein R' is a straight or branched chain alkyl group represented by $C_{x'}H_{2x'+1}$ where x' ranges from 4 to 12, and A' is a polyoxyethylene chain.

7. The process for producing an aqueous polytetrafluoroethylene dispersion according to claim 1, wherein the content of the anionic perfluorocarboxylate surfactant is less than 500 ppm based on the weight of polytetrafluoroethylene in the emulsion.

8. The process for producing an aqueous polytetrafluoroethylene dispersion according to claim 7, wherein the content of the anionic perfluorocarboxylate surfactant is less than 300 ppm.

9. A process for producing an aqueous polytetrafluoroethylene dispersion, comprising:

further adding from 0 to 20 wt %, based on the weight of polytetrafluoroethylene, of a nonionic surfactant, and from 20 to 500 weight %, based on the weight of polytetrafluoroethylene, of water to the polytetrafluoroethylene-rich aqueous dispersion prepared by the process of claim 6; and then further concentrating the polytetrafluoroethylene by sedimentation of said polytetrafluoroethylene-rich aqueous dispersion which produces two aqueous phases which are an aqueous supernatant phase that contains nonionic surfactant and a polytetrafluoroethylene-rich aqueous dispersion; and separating the polytetrafluoroethylene-rich aqueous dispersion from the aqueous supernatant that contains said anionic perfluorocarboxylate surfactant.

10. A process for producing an aqueous polytetrafluoroethylene dispersion composition, consisting essentially of:

adding from 2 to 20 wt %, based on the weight of polytetrafluoroethylene, of a nonionic surfactant, having an average molecular weight ranging from 450 to 800 and an inorganic/organic property ratio ranging from 1.07 to 1.50, and from 10 to 800 weight %, based on the weight of polytetrafluoroethylene, of water to an aqueous polytetrafluoroethylene polymer emulsion having a polytetrafluoroethylene content ranging from 10 to 50 wt % that is obtained by emulsion polymerization of tetrafluoroethylene in the presence of an anionic perfluorocarboxylate surfactant, thereby producing an aqueous polytetrafluoroethylene dispersion having a polytetrafluoroethylene content ranging from 1 to 40 wt %;

obtaining a polytetrafluoroethylene-rich dispersion by permitting said aqueous polytetrafluoroethylene dispersion formed in the step above to separate into two aqueous phases, the supernatant phase being an aqueous phase substantially containing said anionic perfluorocarboxylate surfactant and the remaining phase being said polytetrafluoroethylene-rich aqueous dispersion; and separating the polytetrafluoroethylene-rich aqueous dispersion from the aqueous supernatant that contains said anionic perfluorocarboxylate surfactant.

* * * * *